UNITED STATES PATENT OFFICE.

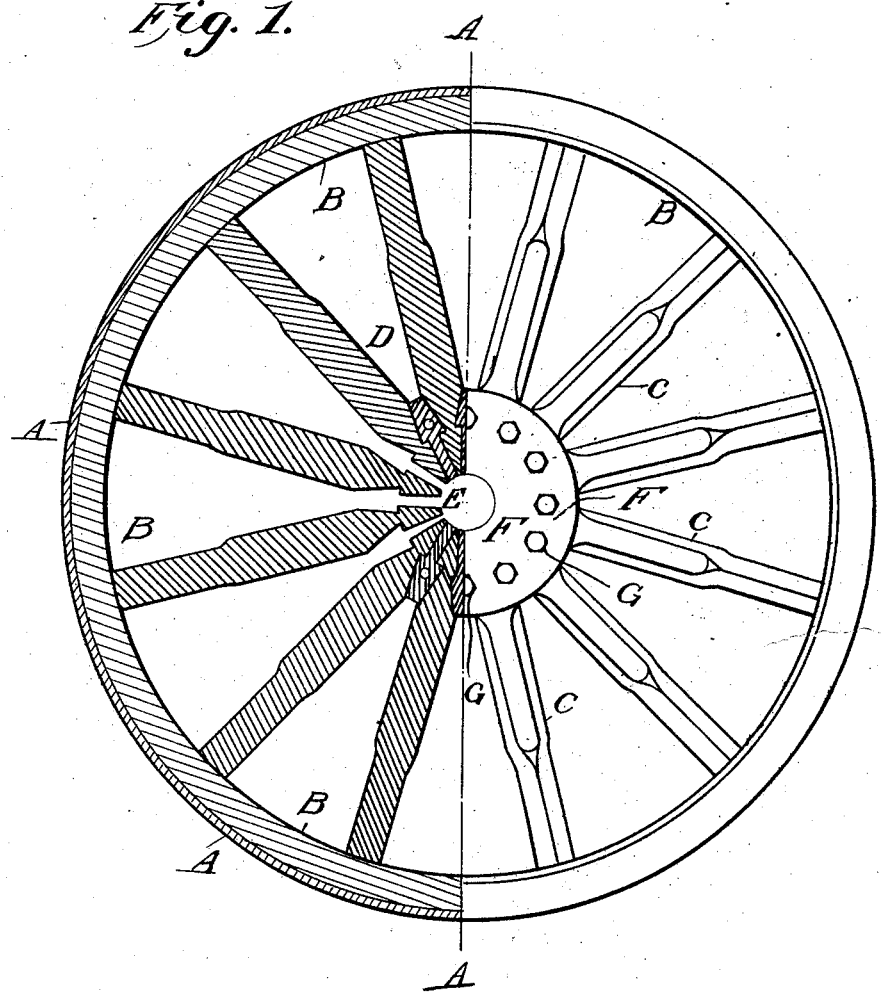

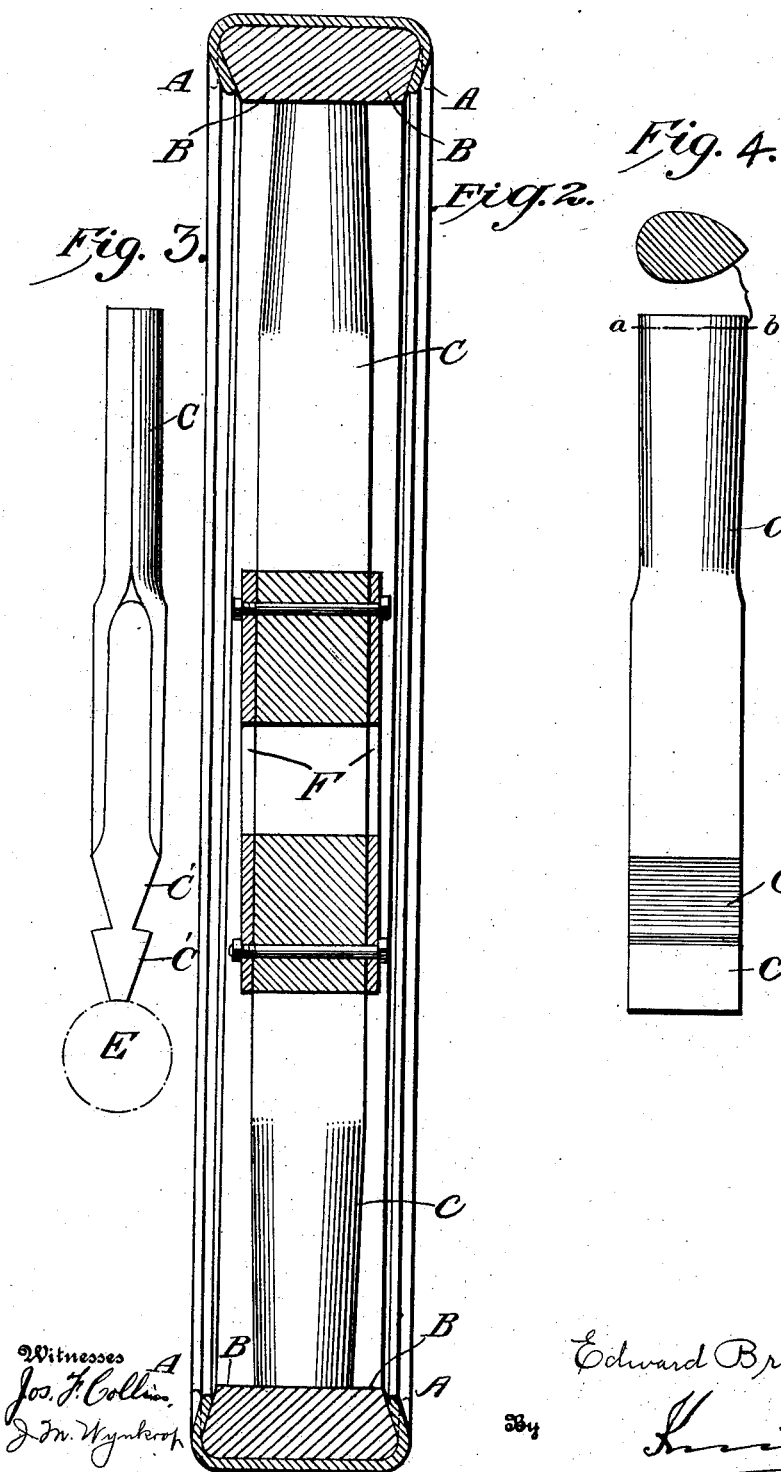

EDWARD BRICE KILLEN, OF LONDON, ENGLAND.

VEHICLE-WHEEL.

1,016,330.  Specification of Letters Patent.  Patented Feb. 6, 1912.

Application filed January 5, 1909. Serial No. 470,885.

*To all whom it may concern:*

Be it known that I, EDWARD BRICE KILLEN, of 52 Queen Victoria street, London, England, engineer, have invented certain new and useful Improvements in Vehicle-Wheels, of which the following is a specification.

The present invention relates to vehicle wheels, more particularly to the structure of spokes therefor and is designed with especial reference to that type of wheel used on caissons and heavy trucks.

The purpose of the invention is to provide a spoke, which with the securing means therefor effect to mutually reinforce or brace each other and give to the finished wheel its greatest possible rigidity; and wherein said spokes also constitute the hub proper of the wheel.

Another object which the invention contemplates is the construction of a spoke that may be readily applied to or removed from position in the wheel without unnecessarily disturbing other parts of the wheel.

In the accompanying drawings the invention is shown in its preferred structure.

In the different views shown, Figure 1 is a part elevation and part sectional view of a wheel complete, constructed in accordance with the present invention; Fig. 2 is a sectional view thereof taken on the line A—A, looking toward the left. Fig. 3 is a front elevation of the spoke; Fig. 4 is a side elevation and section of the spoke, and Fig. 5 is a side elevation and section of the wedge block.

Referring in detail to the several illustrations, the character A designates the wheel tire, and B the felly thereof. Suitably secured to said felly B are the spokes C each having its end portion C' thereof shaped after the manner of a double arrow head, and coöperating with said spokes are a number of wedge blocks D, each consisting of an arrow head and a shank portion. The design of said blocks D is complementary to that of two of the spoke ends C' when the latter parts are in assembled position on the wheel, and in this relation the said spoke sections C and filler pieces D coöperate throughout to provide the wheel hub. When in applied position, the members D effect a wedging action on the several spokes C and thus securely hold the latter parts together.

With the several parts C, C' and D secured in the manner above described, the same are further fastened together by means of the two side clamping plates F, said plates being held secured thereon through the medium of bolts G which pass through the plates and through the apertures within the blocks D.

What is claimed as new is:

In a wheel, the combination with a tire and felly, of spokes terminating at their inner ends in a double arrow head, the adjacent inner ends being spaced apart, and arrow head shaped wedges constructed to fill the spaces between the inner ends of the spokes and interlock with the double arrow heads of the adjacent spokes.

In witness whereof I affix my signature in presence of two witnesses.

EDWARD BRICE KILLEN.

Witnesses:
 JOHN LIDDLE,
 JOHN TRAIN LIDDLE.

Copies of this patent may be obtained for five cents each, by addressing the "Commissioner of Patents, Washington, D. C."